(12) United States Patent
Shin

(10) Patent No.: US 8,059,227 B2
(45) Date of Patent: Nov. 15, 2011

(54) LIQUID CRYSTAL DISPLAY DEVICE HAVING PRINTED CIRCUT BOARD AND METHOD FOR ASSEMBLING THE PRINTED CIRCUIT BOARD

(75) Inventor: Chung-Hyuk Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 736 days.

(21) Appl. No.: 12/170,691

(22) Filed: Jul. 10, 2008

(65) Prior Publication Data
US 2009/0115928 A1 May 7, 2009

(30) Foreign Application Priority Data
Nov. 6, 2007 (KR) .......................... 10-2007-0112716

(51) Int. Cl.
*G02F 1/1333* (2006.01)
*G02F 1/1345* (2006.01)

(52) U.S. Cl. ........................... 349/58; 349/149; 349/150

(58) Field of Classification Search .................... 349/58, 349/149, 150, 151, 152
See application file for complete search history.

(56) References Cited

U.S. PATENT DOCUMENTS
6,587,355 B2 * 7/2003 Park et al. .................... 361/799

FOREIGN PATENT DOCUMENTS
| JP | 2001-265239 | 9/2001 |
| KR | 10-2005-0009365 | 1/2005 |
| KR | 10-2006-0124913 | 12/2006 |

* cited by examiner

*Primary Examiner* — Michael Caley
(74) *Attorney, Agent, or Firm* — F. Chau & Associates, LLC

(57) ABSTRACT

A liquid crystal display (LCD) device includes an LCD panel, a panel driver that includes a source printed circuit board (PCB) substrate having a fixing protrusion hole to supply driving signals to the LCD panel, and a top chassis to receive the LCD panel and the panel driver. The top chassis includes an upper frame portion to prevent the LCD panel from moving upwardly, a side frame portion to prevent the LCD panel from moving sideward, and a fixing protrusion protruded from an inner side of the side frame portion. The fixing protrusion is coupled to the fixing protrusion hole to fix the source PCB inside the side frame portion of the top chassis.

21 Claims, 17 Drawing Sheets

LIQUID CRYSTAL DISPLAY DEVICE HAVING PRINTED CIRCUT BOARD AND METHOD FOR ASSEMBLING THE PRINTED CIRCUIT BOARD

CROSS-REFERENCE TO RELATED APPLICATION

This application claims priority from Korean Patent Application No. 10-2007-0112716, filed on Nov. 6, 2007, the disclosure of which is hereby incorporated by reference in its entirety.

BACKGROUND OF THE INVENTION

1. Technical Field

The present disclosure relates to a liquid crystal display ("LCD") device capable of simplifying a manufacturing process, and to a method of mounting a printed circuit board ("PCB") substrate in the LCD device.

2. Discussion of Related Art

The importance of liquid crystal display ("LCD's") devices, which are a type of information display device, has increased due to the nature of modern society becoming more of an information society. A cathode ray tube ("CRT") has certain difficulties associated therewith such as downsizing and portability, even though it may also have certain benefits such as high performance and low prices. On the contrary, an LCD device has advantages such as, for example, a smaller size, lighter weight, smaller power consumption and so on over the CRT, and thus has become a substitute display device for the CRT.

An LCD device typically includes a LCD panel, a panel driver, a backlight assembly, a bottom chassis, a middle mold, and a top chassis.

The panel driver includes a driving integrated circuit ("IC") to drive gate and data lines of the LCD panel, a timing controller to control the driving IC, a power voltage supply part to supply voltage signals to the LCD panel and driving circuits. Components of the timing controller and the power voltage supply part are mounted on a PCB to supply data signals to the LCD panel.

The backlight assembly includes lamps to generate light, a reflective sheet and an optical sheet to improve light efficiency. The backlight assembly includes the bottom chassis and the middle mold to receive and protect the backlight assembly. The backlight assembly is coupled to the top chassis to prevent the movement of the above elements.

A source PCB is mounted on the LCD panel through a tape carrier package ("TCP"). Such source PCB is disposed on a side surface of the bottom chassis, with the middle mold disposed therebetween, and is fixed by screw. However, the fixing process by the screw may need more manufacture processing time, and may also deteriorate reproducibility in the manufacture processing time. Particularly, since various components are mounted on the source PCB, a short defect may occur by electrically contacting with adjacent metallic materials when the source PCB moves freely without being fixed at someplace. Thus, as a result, the electrical short may cause the screen quality to deteriorate.

SUMMARY

Exemplary embodiments of the present invention provide an LCD device for improving screen quality and production efficiency of the LCD device by efficiently coupling a source PCB to a top chassis.

Exemplary embodiments of the present invention also provide a method assembling a PCB in the LCD device.

In accordance with an exemplary embodiment of the present invention, a liquid crystal display (LCD) device is provided. The LCD device includes an LCD panel, a panel driver that includes a source printed circuit board (PCB) substrate having a fixing protrusion hole to supply driving signals to the LCD panel and a top chassis to receive the LCD panel and the panel driver. The top chassis includes an upper frame portion to prevent the LCD panel from moving upwardly, a side frame portion to prevent the LCD panel from moving sideward, and a fixing protrusion protruded from an inner side of the side frame portion. The fixing protrusion is coupled to the fixing protrusion hole to fix the source PCB inside the side frame portion of the top chassis.

The fixing protrusion may have in a taper shape and a width of the fixing protrusion may gradually narrow from the side frame portion of the top chassis to the inner side of the top chassis.

The fixing protrusion hole may be formed at an inner part of the source PCB.

The fixing protrusion hole may be formed at an edge part of the source PCB.

The LCD device may further include a backlight assembly, a bottom chassis on which the backlight assembly is mounted and a middle mold to surround an outer surface of the bottom chassis to prevent the backlight assembly separation and to support the LCD panel.

The top chassis may include a pressure protrusion on the side frame portion to pressure the source PCB inwardly.

The middle mold may include an embo protruded from an outer surface to pressure the source PCB outwardly and the source PCB may include an embo hole being coupled to the embo.

The middle mold may have a penetration hole on the outer surface and the fixing protrusion may contact with the bottom chassis through the penetration hole.

In accordance with an exemplary embodiment of the present invention, a liquid crystal display (LCD) device is provided. The LCD device includes an LCD panel, a panel driver that includes a source printed circuit board (PCB) substrate having a fixing protrusion hole and a top chassis to receive the LCD panel and the panel driver. The top chassis that includes an upper frame portion to prevent the LCD panel from moving upwardly, a side frame portion to prevent the LCD panel from moving sideward, and a fixing protrusion protruded from an inner side of the side frame portion. The fixing protrusion is coupled to the fixing protrusion hole to fix the PCB to the inner side of the side frame portion of the top chassis. The device further includes a backlight assembly, a bottom chassis on which the backlight assembly is mounted, and a middle mold to surround an outer surface of the bottom chassis, to prevent backlight assembly separation, and to support the LCD panel and wherein the top chassis contacts with the bottom chassis through the fixing protrusion.

The fixing protrusion may have a taper shape and a width of the fixing protrusion may gradually narrow from the side frame portion of the top chassis to the inner side of the top chassis.

The fixing protrusion hole may be formed at an inner part of the PCB.

The fixing protrusion hole may be formed at an edge part of the PCB.

The top chassis may include a pressure protrusion on the side frame portion to pressure the PCB inwardly.

The middle mold may include an embo protruded from an outer surface to pressure the PCB outwardly and the PCB may include an embo hole being coupled to the embo.

The middle mold may have a penetration hole on the outer surface and the fixing protrusion may contact with the bottom chassis through the penetration hole.

In accordance with another exemplary embodiment of the present invention, a method of mounting a printed circuit board (PCB) substrate in a liquid crystal display (LCD) device is provided. The method includes providing an LCD panel including a top chassis that includes an upper frame portion to prevent the LCD panel from moving upwardly and a side frame portion to prevent the LCD panel from moving sideward. The method further includes forming a fixing protrusion hole on the PCB, forming a fixing protrusion at an inner side of the side frame portion of the top chassis, and coupling the fixing protrusion to the fixing protrusion hole and fixing the PCB inside the side frame portion of the top chassis.

The fixing protrusion may have a taper shape and a width of the fixing protrusion may gradually narrow from the side frame portion of the top chassis to the inner side of the top chassis.

The fixing protrusion hole may be formed at an inner part of the PCB.

The fixing protrusion hole may be formed at an edge part of the PCB.

BRIEF DESCRIPTION OF THE DRAWINGS

Exemplary embodiments of the present invention can be understood in more detail from the following description taken in conjunction with the attached drawings.

DETAILED DESCRIPTION OF THE EXEMPLARY EMBODIMENTS OF THE INVENTION

Reference will now be made in detail to exemplary embodiments of the present disclosure, examples of which are illustrated in the accompanying drawings. Wherever possible, the same reference numbers will be used throughout the drawings to refer to the same or like parts.

Figure 1:
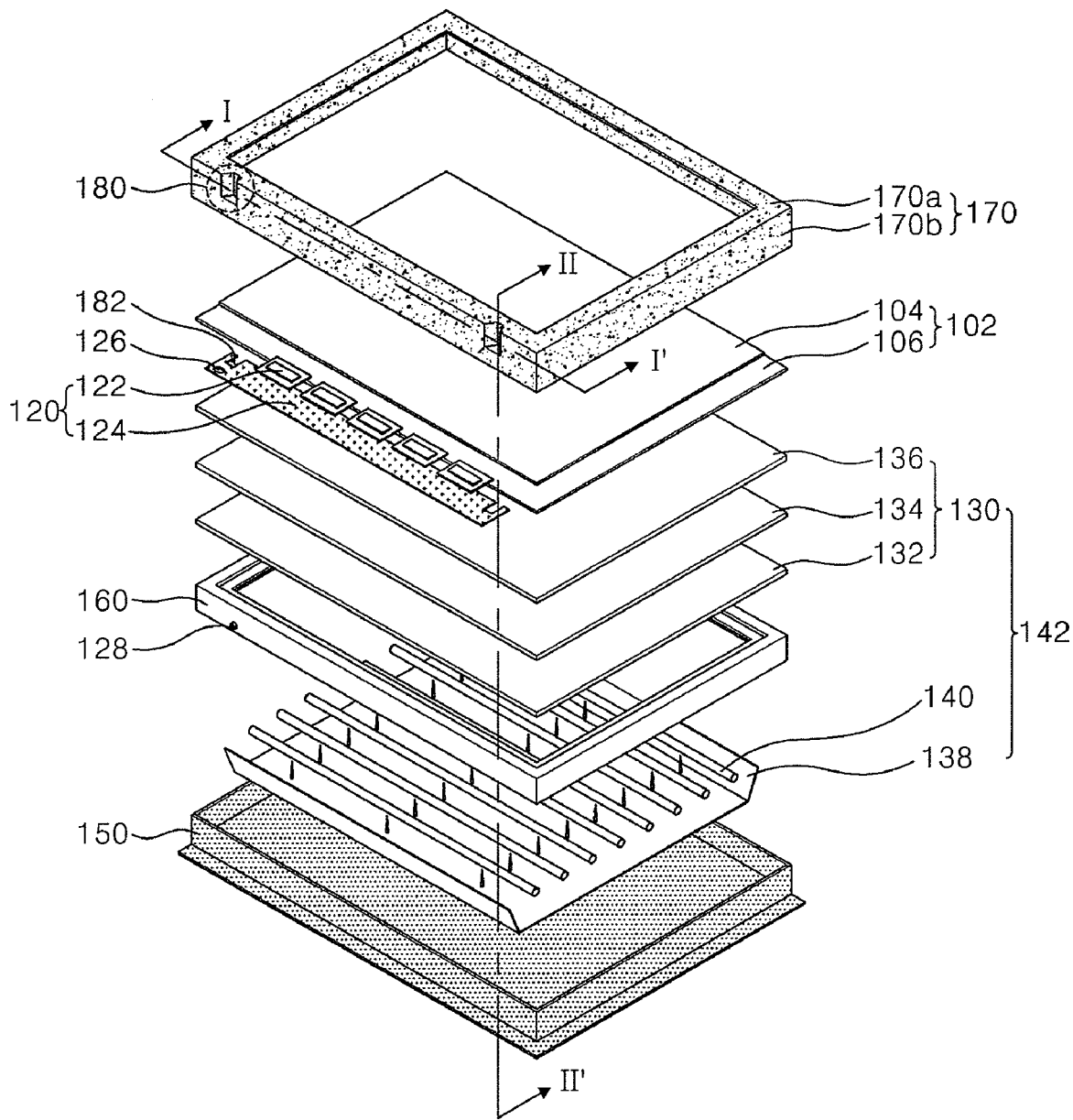
FIG. 1 is an explored perspective view of an LCD device according to an exemplary embodiment of the present invention.
Figure 2A:
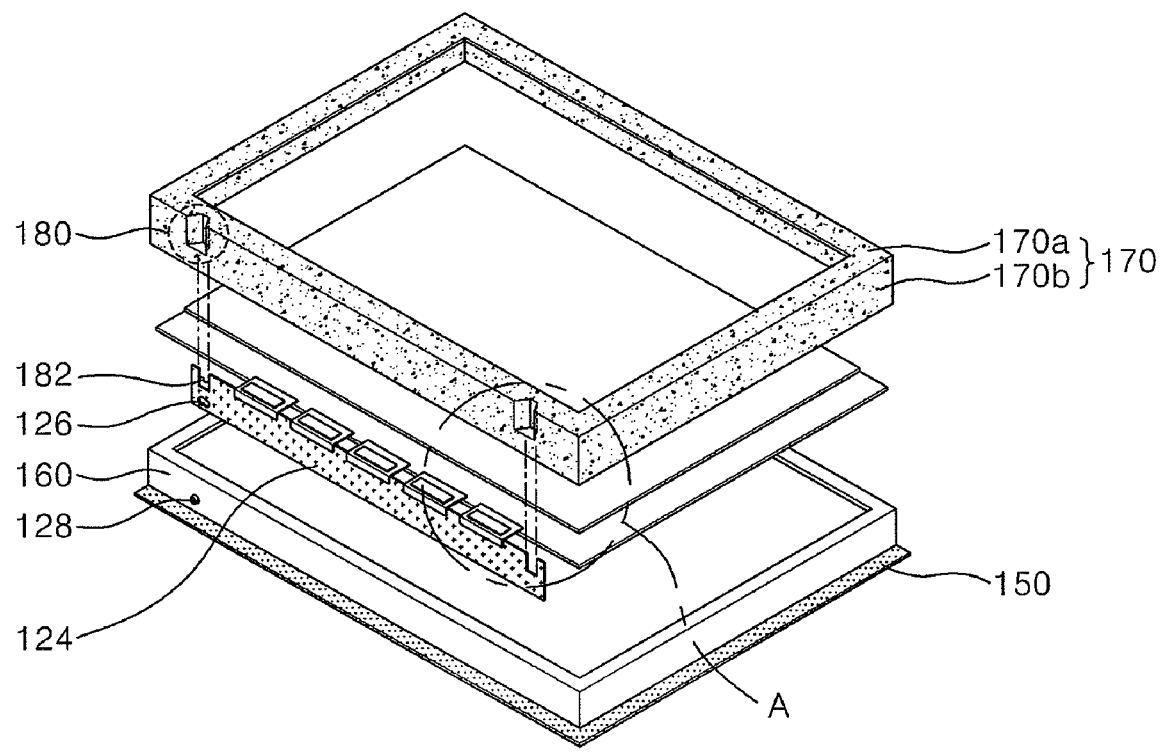
FIG. 2A is an exploded perspective view showing assemble relationship between a source PCB and a top chassis according to the exemplary embodiment of the present invention of FIG. 1.
Figure 2B:
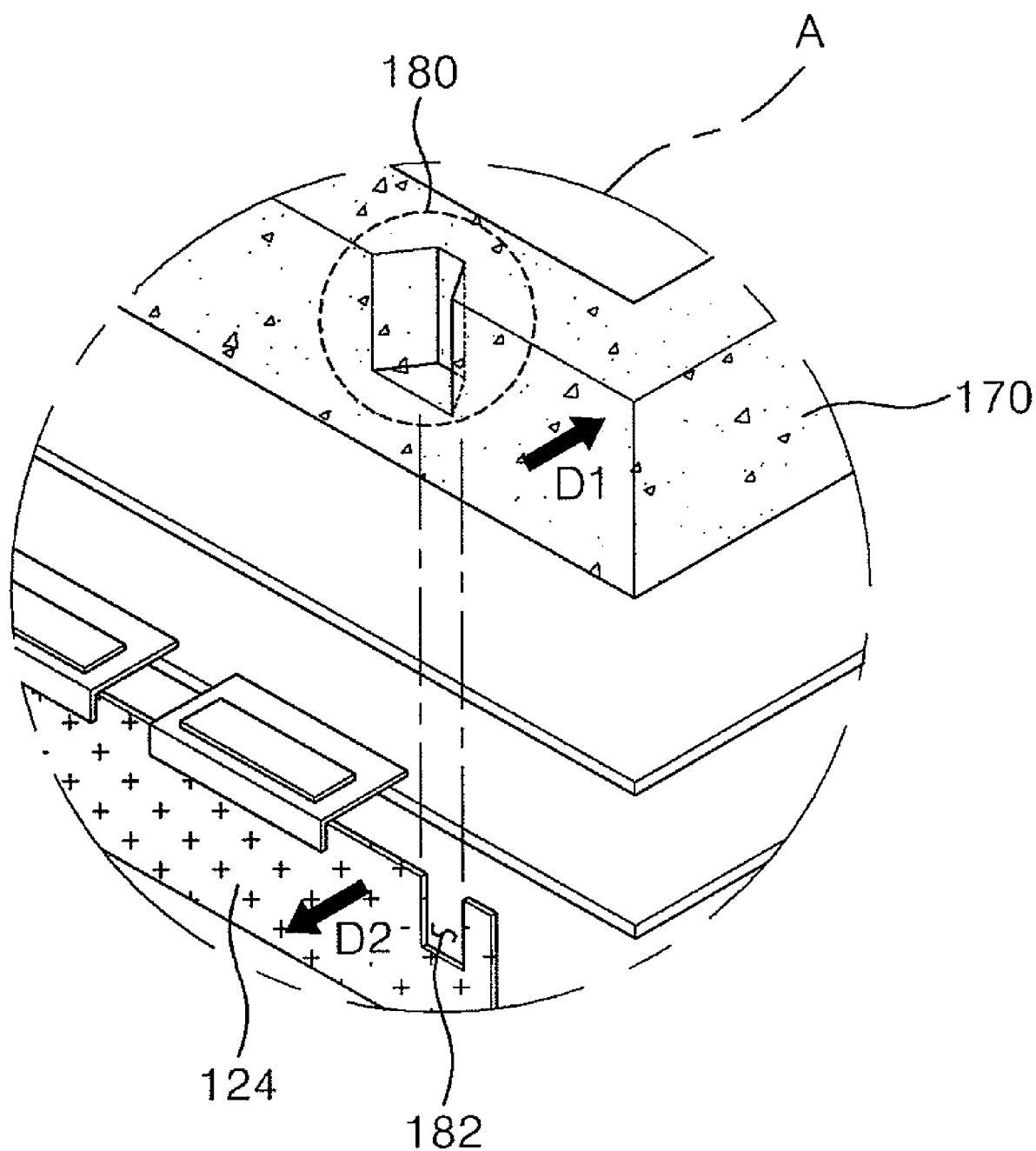
FIG. 2B is an enlarged partial perspective view showing a portion A in FIG. 2APCB.
Figure 3A:
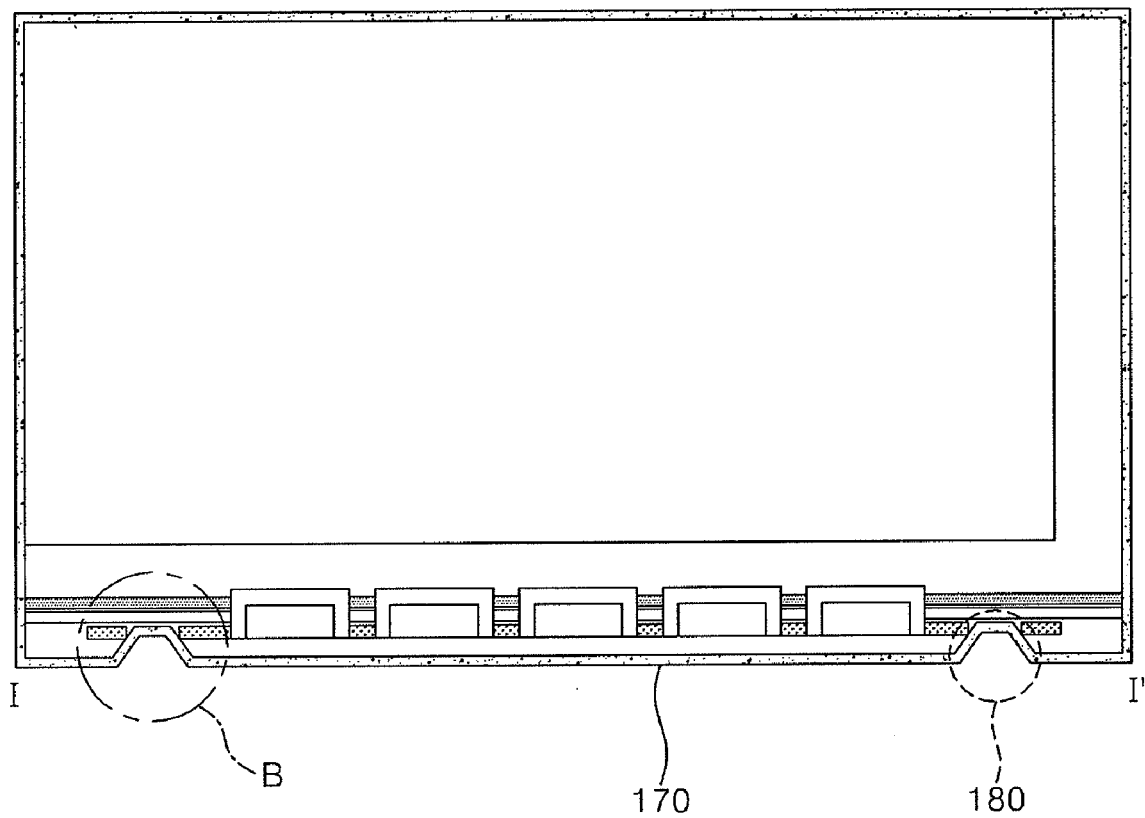
FIG. 3A is a cross-sectional view showing taken along line I-I' of FIG. 1.
Figure 3B:
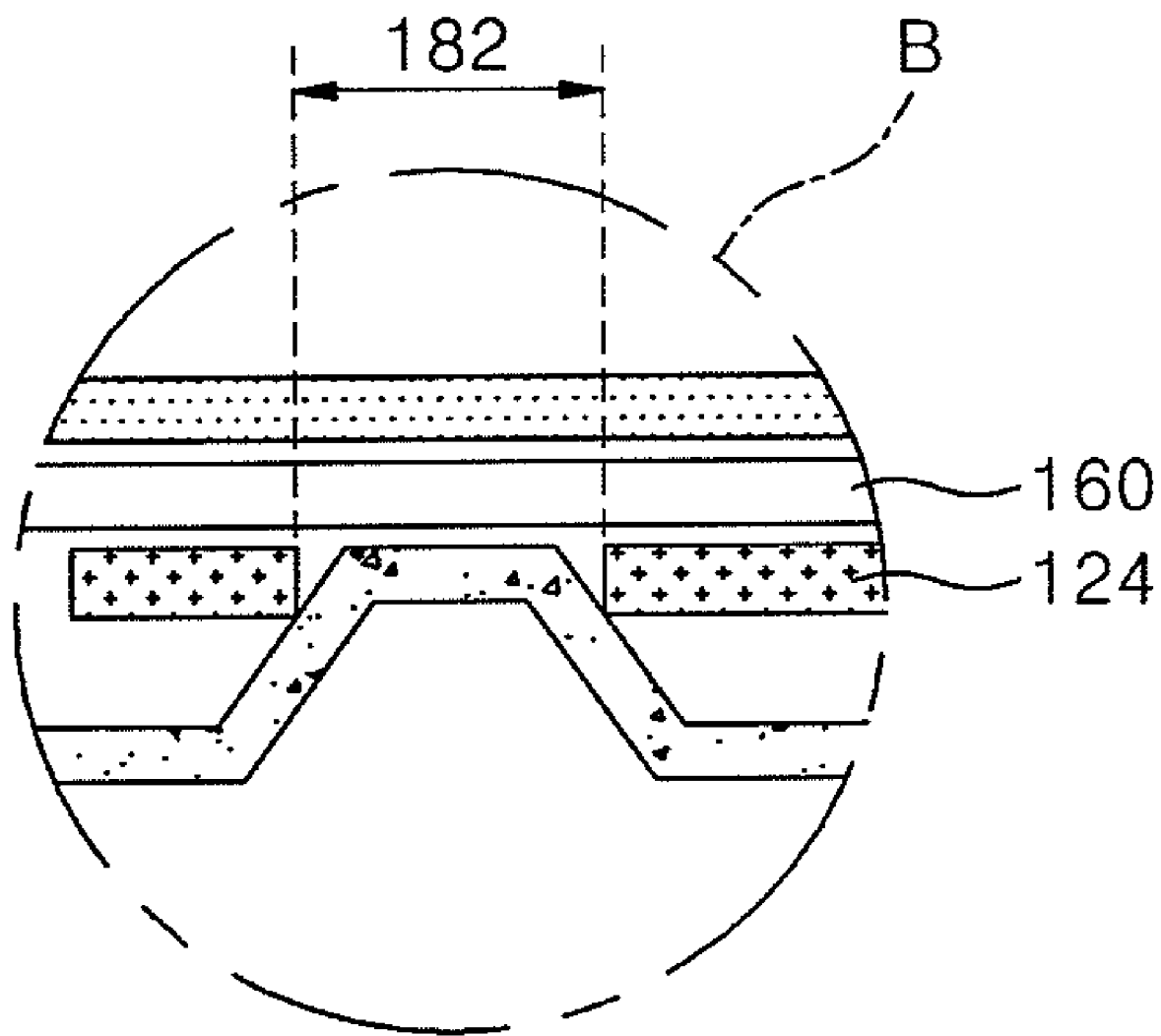
FIG. 3B is an enlarged partial perspective view showing a portion B in FIG. 3A.
Figure 4:
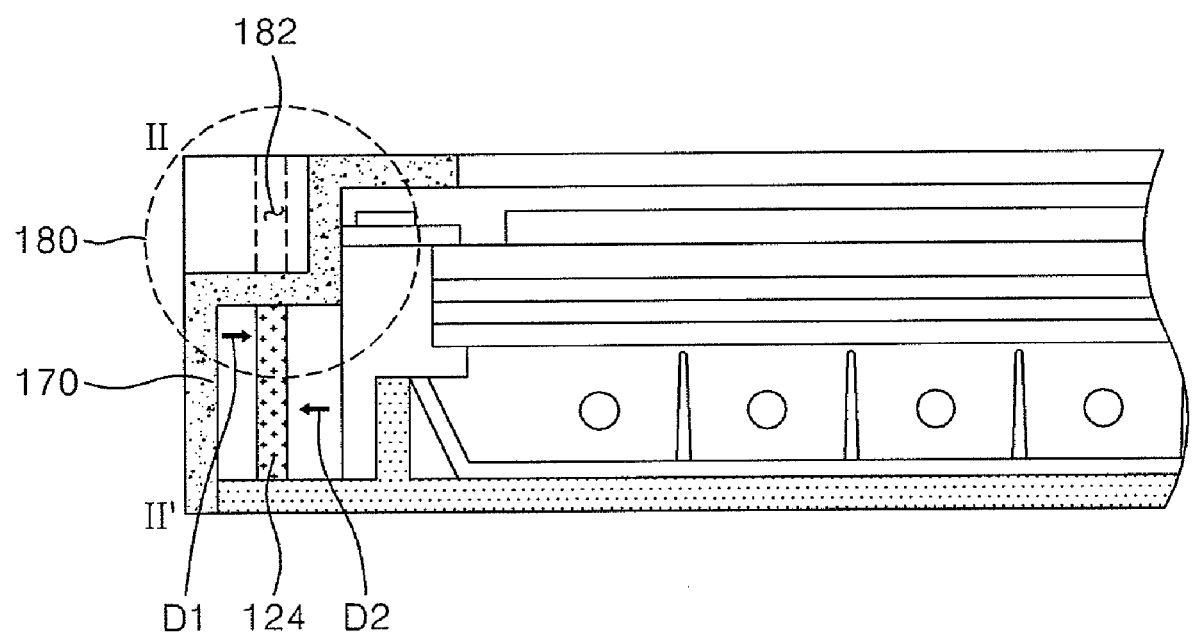
FIG. 4 is a cross-sectional view showing taken along line II-II' of FIG. 1.

FIG. 1 is an exploded perspective view showing an LCD device according to a first exemplary embodiment of the present invention, and FIG. 2A is an exploded perspective view showing a coupling relationship between a source PCB and a top chassis according to a first exemplary embodiment of the present invention, and FIG. 2B is an enlarged partial perspective view showing a portion A in FIG. 2A. FIG. 2A and FIG. 2B show the coupling state of a bottom chassis 150, a backlight assembly 142 and a middle mold 160 for easy comprehension. FIG. 3A is a cross-sectional view taken along line I-I' of FIG. 1, and FIG. 3B is an enlarged partial perspective view a portion B in FIG. 3A. FIG. 4 is a cross-sectional view showing taken along line II-II' of FIG. 1.

As shown in FIG. 1 to FIG. 4, an LCD device 100 according to a first exemplary embodiment of the present invention includes an LCD panel 102, a panel driver, a backlight assembly 142, a bottom chassis 150, a middle mold 160, and a top chassis 170.

The LCD panel 102 includes a thin film transistor ("TFT") substrate and a color filter substrate 104 facing a TFT substrate and liquid crystal layer interposed between the two substrates to control light transmissivity. A color filter array is formed on the color filter substrate 104. The color filter array includes black matrixes to prevent light leakage, color filters to implement colors, common electrodes forming vertical electric field with pixel electrodes, and upper alignment layers thereon to align the orientation direction of liquid crystal molecules.

A TFT array is formed on the TFT substrate 106. The TFT array includes data and gate lines formed to intersect each other, TFTs formed at intersection portions of the data and gate lines, pixel electrodes connected to the TFTs, and lower alignment layers thereon to align the orientation direction of liquid crystal molecules.

The panel driver includes gate drivers to drive the gate lines of the LCD panel 102 and data drivers to drive the data lines of the LCD panel 102.

The gate driver is mounted on the TFT substrate 106 in an amorphous silicon gate ("ASG") structure. In this case, the gate driver is not limited thereto but, for example, may have structure of a chip on glass ("COG"), a gate PCB or a gate integrated circuit ("IC") mounted on a gate tape carrier package ("TCB") formed between the gate PCB and the TFT substrate 106.

The gate IC sequentially supplies scan signals of a gate high voltage to the gate lines. The gate IC supplies scan signals of a gate low voltage to the gate lines during a period in which the gate high voltage are not supplied. The gate IC receives control signals and power signals from the timing controller and the power voltage supply through signal lines, respectively. The timing controller and the power voltage supply are mounted on a source PCB 124.

The data driver 120 includes the source PCB 124 and a data IC 122 mounted on a data TCB formed between the source PCB 124 and the TFT substrate 106.

The data IC 122 converts pixel data into analog pixel signals to supply the signals to the data lines. The data IC 122 receives a control signal, a power signal, a pixel data and so on from the timing controller and the power voltage supply.

The backlight assembly 142 includes lamps 140, a reflective sheet 138 and optical sheets 130. The lamps 140 generate light by using an external power to supply the light to the LCD panel 102. The lamps 140 are formed at a lower portion of the LCD panel 102 to function as a direct-typed backlight assembly 142. The direct-typed backlight assembly does not require a light guile plate, which directs linear light from a light source to the LCD panel 102. Accordingly, the manufacturing process of the LCD device in accordance with exemplary embodiments of the present invention may be simplified and the manufacturing cost may be reduced.

The reflective sheet 138 is provided at a lower portion of the lamps 140 to reflect light irradiated from the lamps 140 toward the LCD panel 102. The reflective sheet 138 may include materials having reflectivity and diffusivity to function to reflect and diffuse the light.

The optical sheets 130 provided on the lamps 140 include a diffusion sheet 132 to diffuse light, a prism sheet 134 and a protection sheet 136 to protect the diffusion sheet and the prism sheet. The prism sheet 134 is stacked on an upper surface of the diffusion sheet to condense light diffused by the diffusion sheet in a direction substantially perpendicular to a plane of the LCD panel 102. The optical sheets 130 include the diffusion sheet 132, the prism sheet 134, and the protection sheet 136 sequentially stacked on the lamps 140. The exemplary embodiments of the present invention are not limited to this and the optical sheets 130 may include a plurality of the sheets.

The bottom chassis 150 receives and protects the backlight assembly 142. The middle mold 160 is arranged between the bottom chassis 150 and the top chassis 170 to surround the bottom chassis 150, thereby insulating the bottom chassis 150 from the top chassis 170.

The top chassis 170 covers an outer surface of the middle mold 160 and is coupled to the middle mold 160. The top chassis 170 prevents the movement of elements inside the LCD device 100 and protects edges of the LCD panel 102.

The top chassis 170 includes an upper frame portion 170a to prevent the LCD panel 102 from moving upwardly, a side frame portion 170b to prevent the LCD panel 102 from moving sideward, and a fixing protrusion 180 protruded from an inner side of the side frame portion 170b. The source PCB 124 has a fixing protrusion hole 182 to be coupled to the fixing protrusion 180 of the top chassis 170. The source PCB 124 is mounted inside the side frame portion 170b of the top chassis 170 by coupling the fixing protrusion 180 to the fixing protrusion hole 182. Accordingly, the source PCB 124 may be firmly fixed despite external impacts. By using the fixing protrusion 180, the manufacturing process time may decrease and the production efficiency may be improved in comparison with conventional methods of mounting a PCB in the LCD device through a screw.

At least one of the fixing protrusion hole 182 and at least one of the protrusion hole 180 are formed, and two or two more than the fixing protrusion holes 182 and two or two more than the protrusion holes 180 may be formed for more stable fixing of the source PCB 124.

As shown in FIG. 3B, the fixing protrusion 180 penetrates through the fixing protrusion hole 182 of the source PCB 124 to adhere closely to the outer surface of the middle mold 160. The fixing protrusion 180 is protrusion fixed with a predetermined distance from the outer surface of the middle mold 160.

The fixing protrusion 180 has a taper shape and the width of the fixing protrusion 180 gradually narrows toward a first direction D1, which is a direction from the side frame portion of the top chassis 170 to the inner side thereof. As shown in FIG. 4, when the source PCB 124 moves toward a second direction D2, the fixing protrusion 180 may be more firmly coupled to the fixing protrusion hole to prevent movement of the source PCB 124.

Figure 5A:
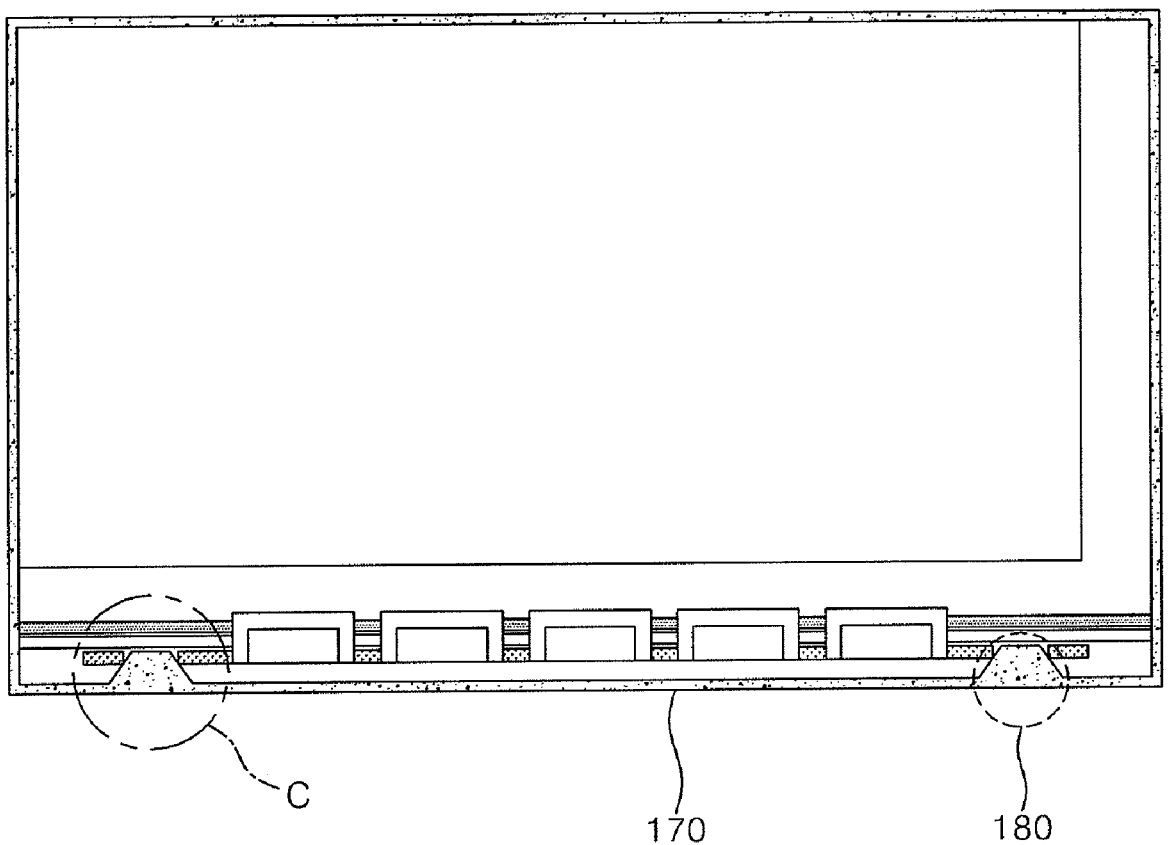
FIG. 5A is a cross-sectional view showing an LCD device according to an exemplary embodiment of the present invention.
Figure 5B:
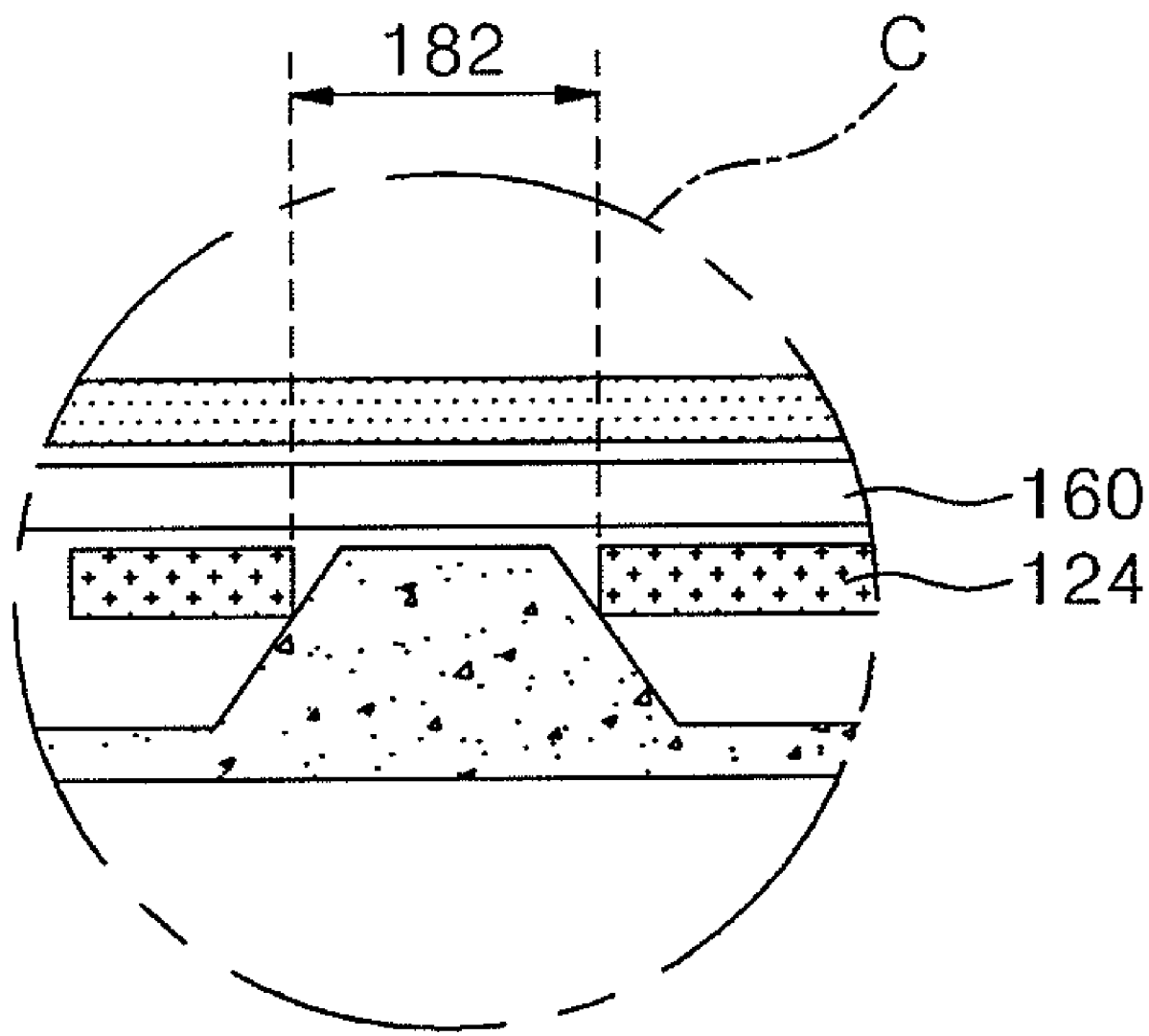
FIG. 5B is an enlarged partial perspective view showing a portion C in FIG. 5A.

As shown in FIG. 1 to FIG. 4, the fixing protrusion 180 may have a rear surface corresponding to a protruding portion of the fixing protrusion in a caved shape. FIG. 5A is a cross-sectional view showing an LCD device according to a second exemplary embodiment of the present invention and FIG. 5B is an enlarged partial perspective view showing a portion C in FIG. 5C. As shown in FIG. 5B, the fixing protrusion 180 may have a rear surface in a flat shape corresponding to the protruding portion of the fixing protrusion.

The middle mold 160 includes a spacing protrusion 128 protruded from a side surface and the source PCB substrate 124 includes a spacing protrusion hole 126. The spacing protrusion 128 is coupled to the spacing protrusion hole 126. This structure may maintain a predetermined distance between the source PCB 124 and the middle mold 160 by the spacing protrusion 128 to prevent inner elements damage.

Figure 6A:
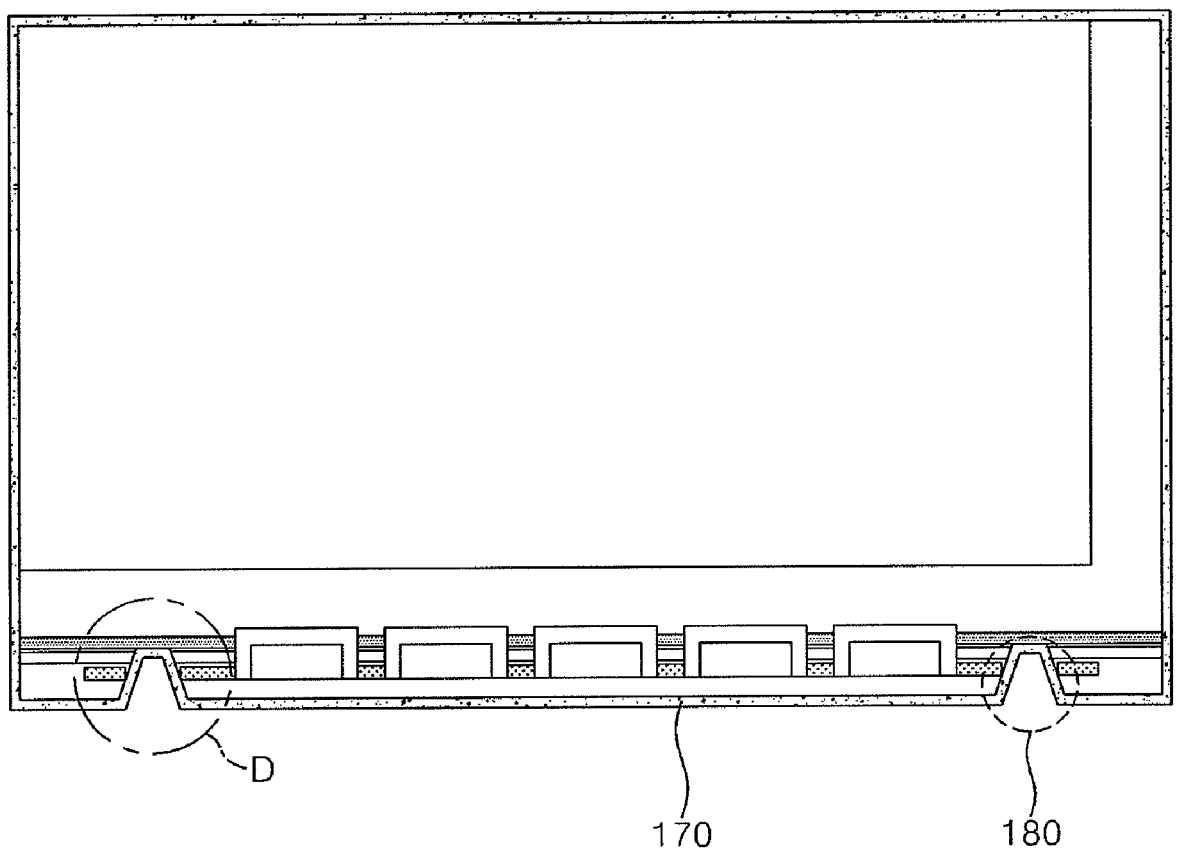
FIG. 6A is a cross-sectional view showing an LCD device according to an exemplary embodiment of the present invention.
Figure 6B:
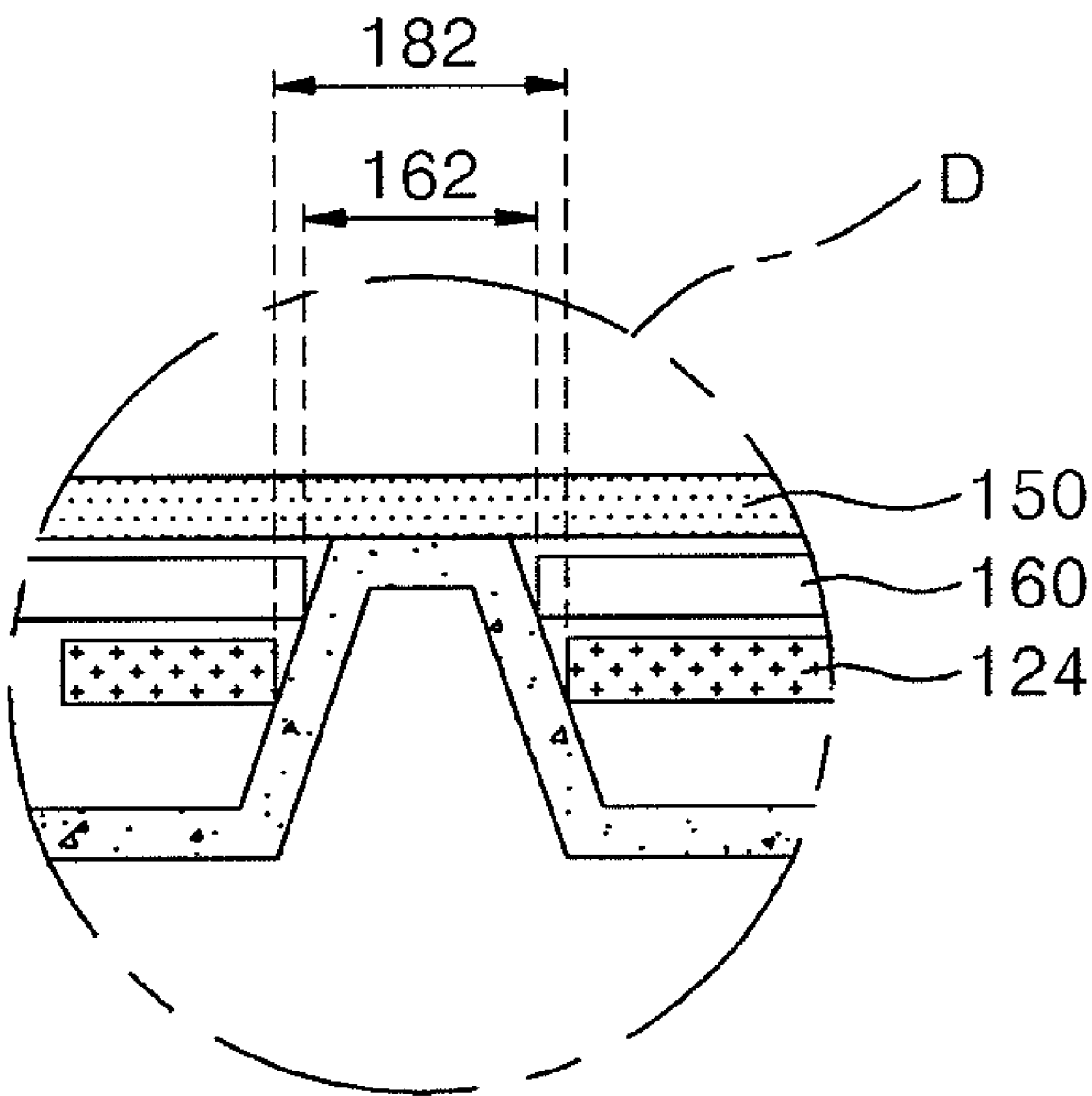
FIG. 6B is an enlarged partial perspective view showing a portion D in FIG. 6A.

FIG. 6A is a cross-sectional view showing an LCD device according to a third exemplary embodiment of the present invention, and FIG. 6B is an enlarged partial perspective view showing a portion D in FIG. 6A. In this exemplary embodiment, the LCD device 100 includes an LCD panel 102, a panel driver, a backlight assembly 142, a bottom chassis 150, a middle mold 160, and a top chassis 170.

As shown in FIG. 6B, a fixing protrusion 180 of the top chassis 170 is coupled to a fixing protrusion hole 182 of a source PCB 124 to prevent the source PCB 124 from being separated from the top chassis 170. The fixing protrusion 180 combines with the fixing hole 182 of the source PCB 124 to prevent the source PCB from escaping toward the top chassis 170. The fixing protrusion 180 is formed by protruding a portion of a side surface of the top chassis 170 toward the inside of the LCD device 100. The protruding portion of the fixing protrusion 180 is formed to narrow toward the inside of the LCD device 100.

The middle mold 160 has a penetration hole 162, and the fixing protrusion 180 penetrates the penetration hole 162 to make contact with the bottom chassis 150. This structure may firmly fix the source PCB 124 and improve a ground effect.

In a conventional LCD device, the top chassis 170 contacts with the bottom chassis 150 through a gasket contained in the source PCB 124 to improve the ground effect, thereby reducing an electromagnetic interference ("EMI"). In this exemplary embodiment of the present invention, the top chassis 170 contacts with the bottom chassis 150 by coupling the fixing protrusion 180 of the top chassis 170 to the penetration hole 162, thereby reducing the EMI.

The fixing protrusion hole 182 according to the first to third exemplary embodiments is formed at top edges of both sides of the source PCB 124, but is not limited thereto, but rather may be formed at various locations and in various shapes.

Figure 7A:
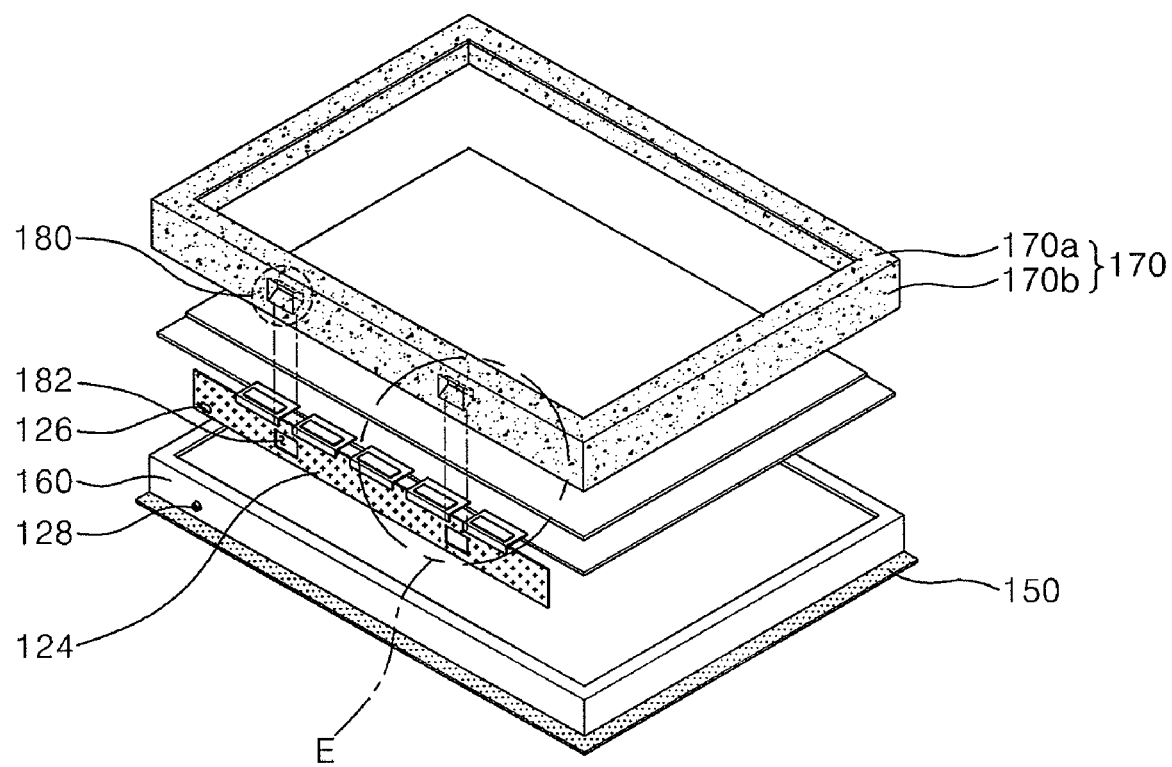
FIG. 7A is an exploded perspective view showing an LCD device according to an exemplary embodiment of the present invention.
Figure 7B:
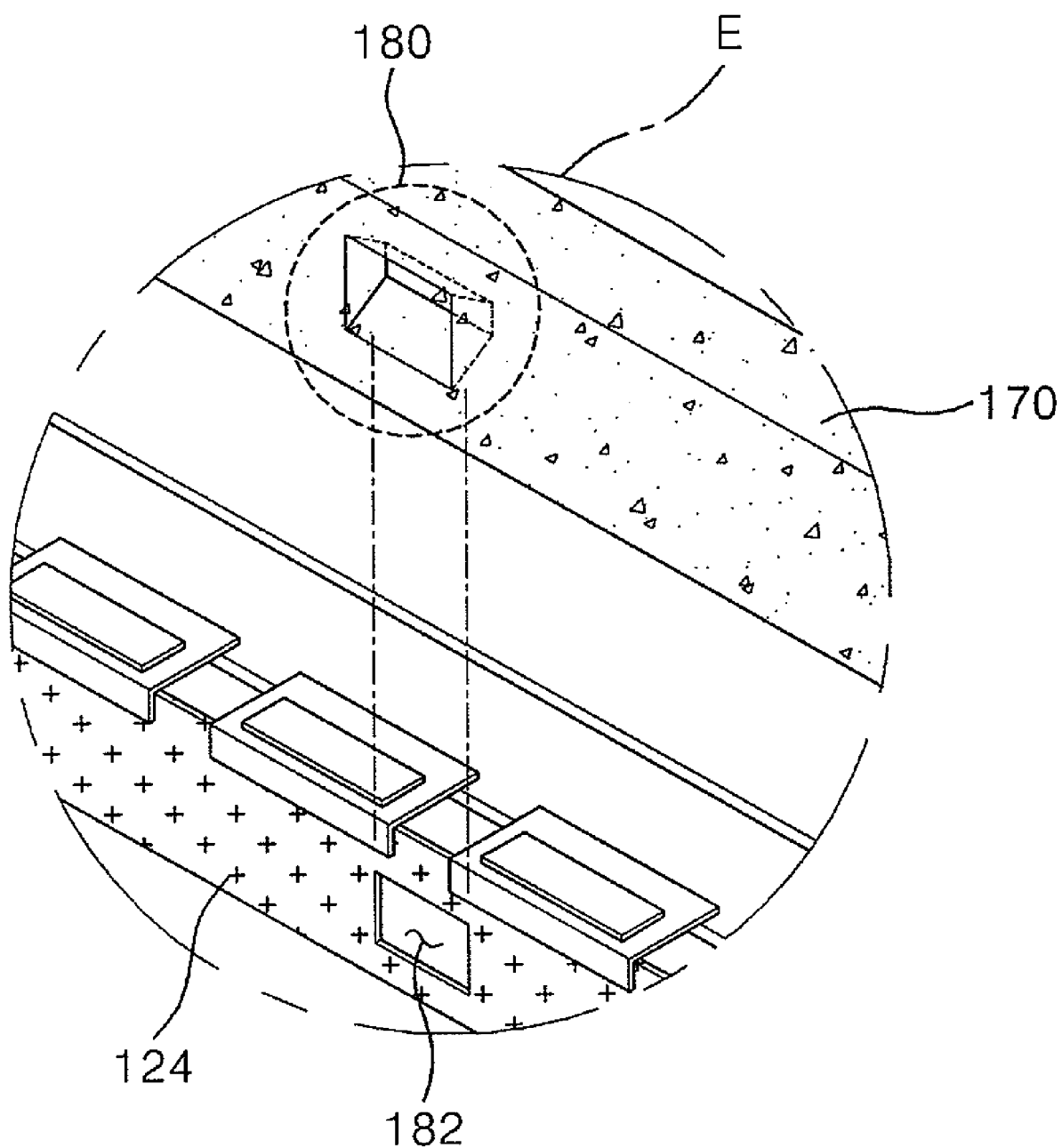
FIG. 7B is an enlarged partial perspective view showing a portion E in FIG. 7A.
Figure 8A:
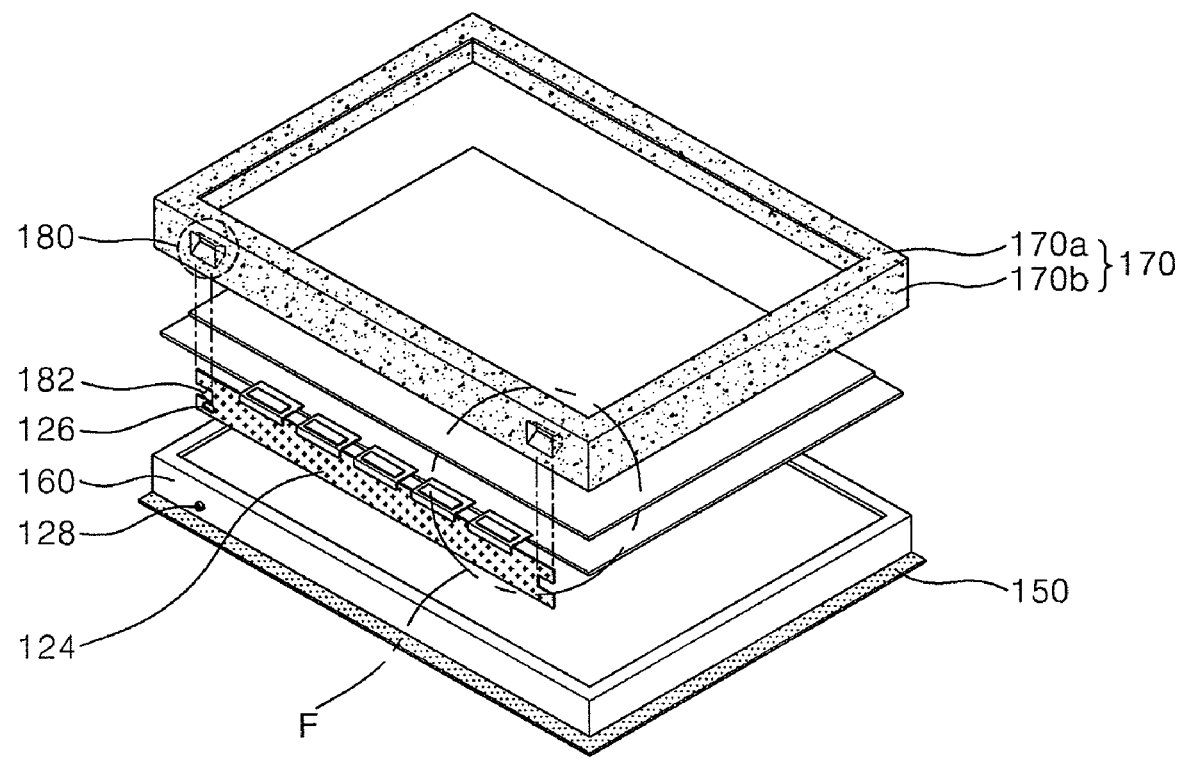
FIG. 8A is an exploded perspective view showing an LCD device according to an exemplary embodiment of the present invention.
Figure 8B:
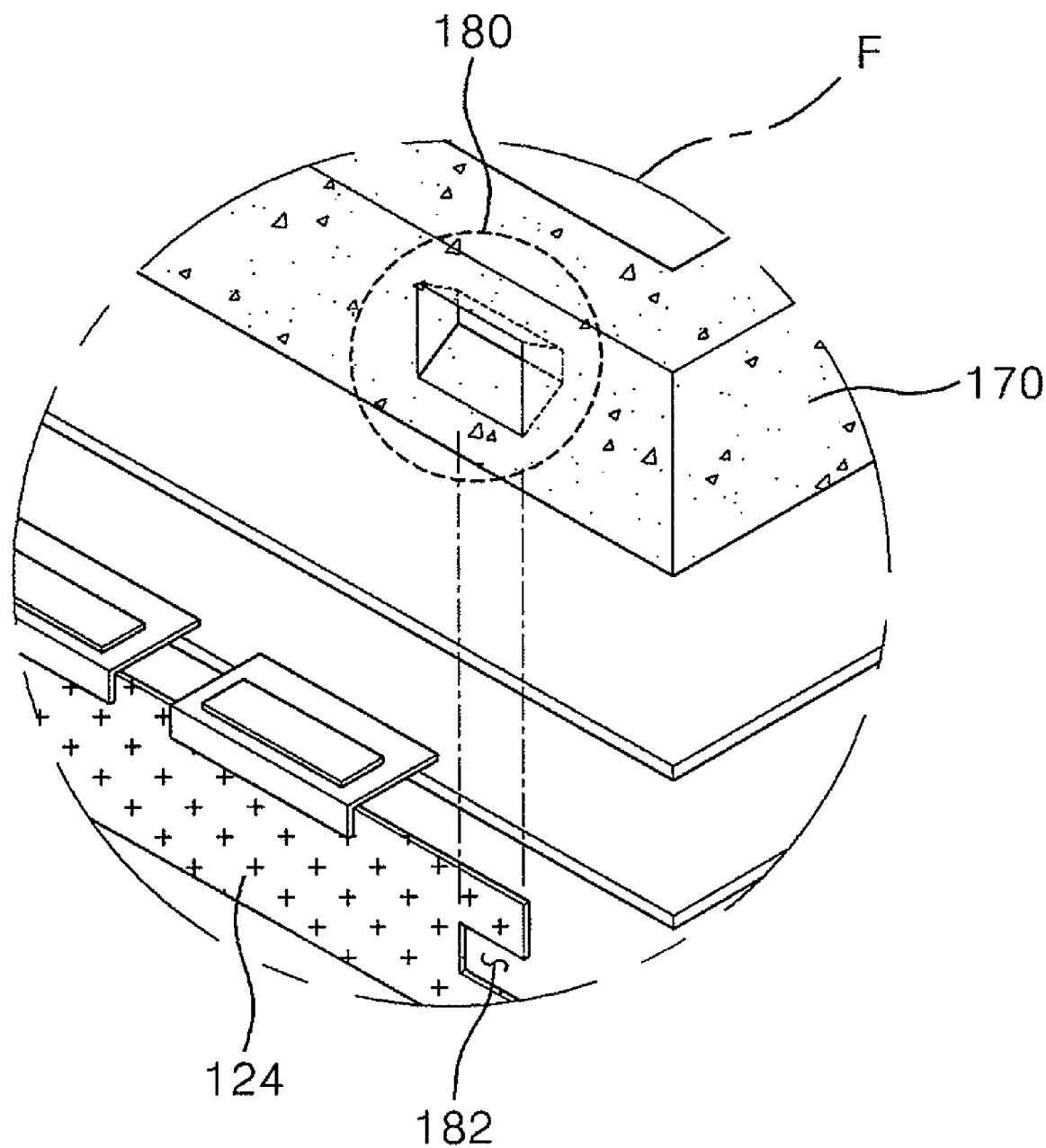
FIG. 8B is a partial enlarged perspective view showing a portion F in FIG. 8A.

FIG. 7A is an exploded perspective view showing an LCD device according to a fourth exemplary embodiment of the present invention and FIG. 7B is an enlarged partial perspective view showing a portion F in FIG. 7A. Two fixing protrusion holes 182 are formed inside a source PCB 124 of the LCD device of the fourth exemplary embodiment, and a fixing protrusion 180 is formed at a position corresponding to the fixing hole 182 of a side frame portion 170b of the top chassis 170 to combine with the fixing hole 182. FIG. 8A is an exploded perspective view showing an LCD device according to a fifth exemplary embodiment of the present invention and FIG. 8B is an enlarged partial perspective view showing a portion F in FIG. 8A. Two fixing protrusion holes 182 are formed at a side edge part of both sides of the source PCB 124 of the LCD device of the fifth exemplary embodiment. In addition, a fixing protrusion 180 is formed at a position corresponding to the fixing hole 182 of the side frame portion 170b of the top chassis 170 to combine with the fixing hole 182.

Figure 9A:
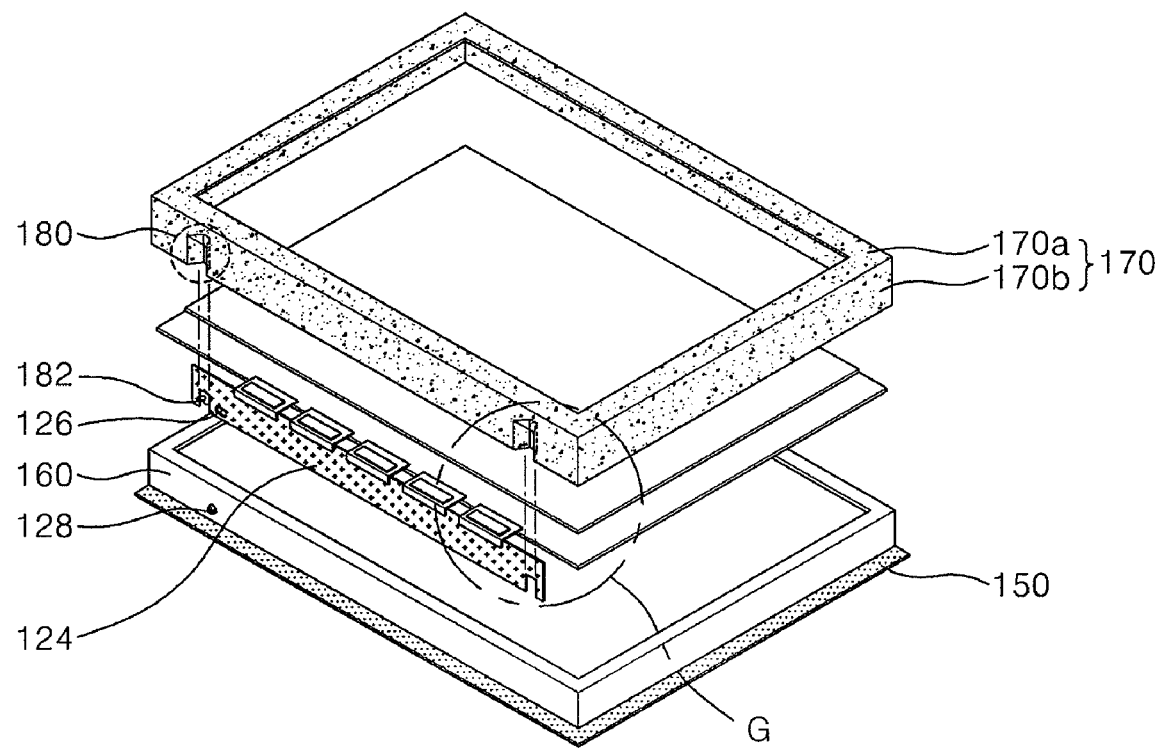
FIG. 9A is an exploded perspective view showing an LCD device according to an exemplary embodiment of the present invention.
Figure 9B:
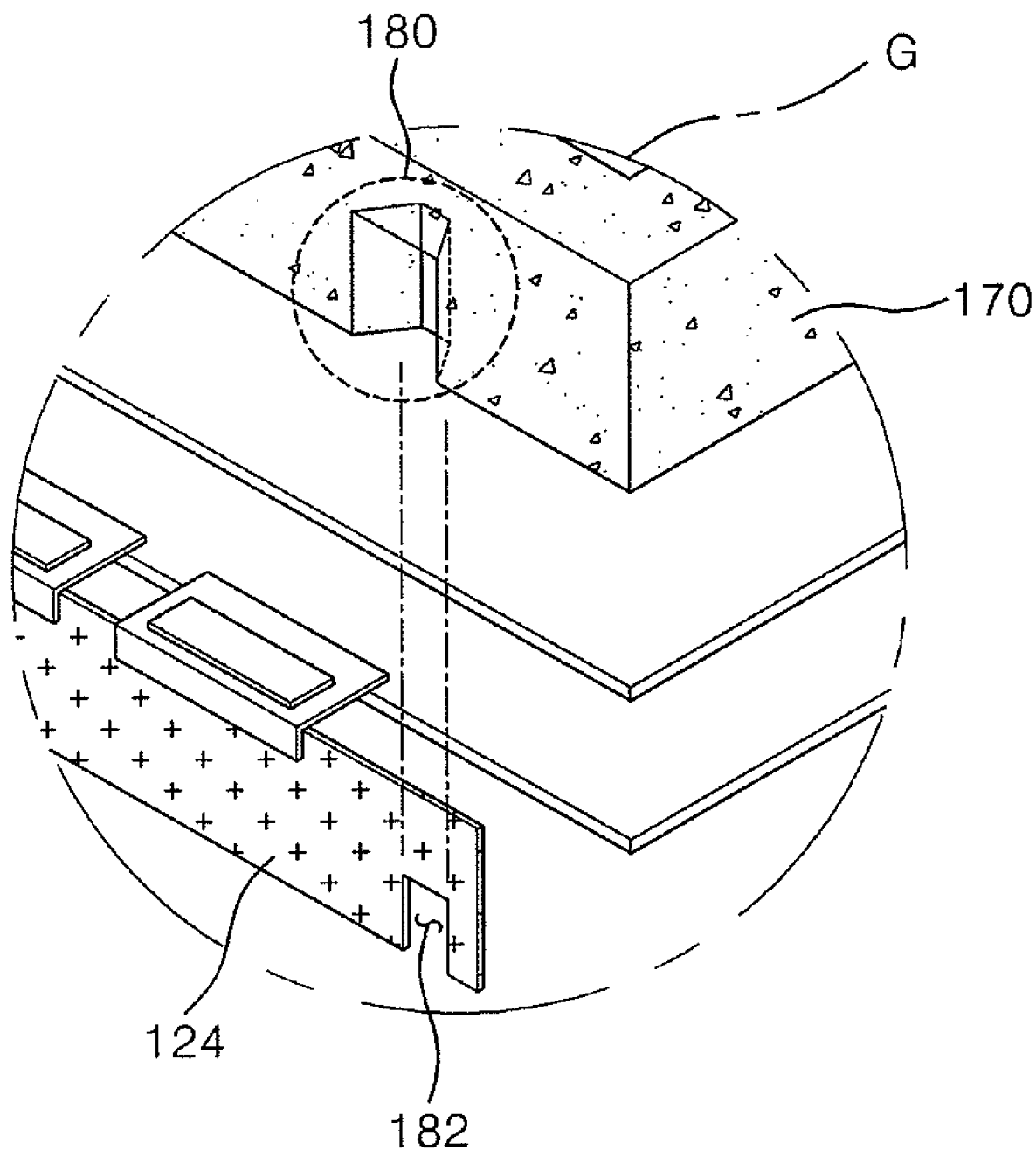
FIG. 9B is an enlarged partial perspective view showing a portion G in FIG. 9A.

FIG. 9A is an exploded perspective view showing an LCD device according to a sixth exemplary embodiment of the present invention and FIG. 9B is an enlarged partial perspective view showing a portion G in FIG. 9A. Two fixing protrusion holes 182 are formed at a lower edge part of both sides of the source PCB 124 of the LCD device of the sixth exemplary embodiment. The fixing protrusion 180 is formed at a position corresponding to the fixing hole 182 of the side frame portion 170b of the top chassis 170 to combine with the fixing hole 182.

Figure 10:
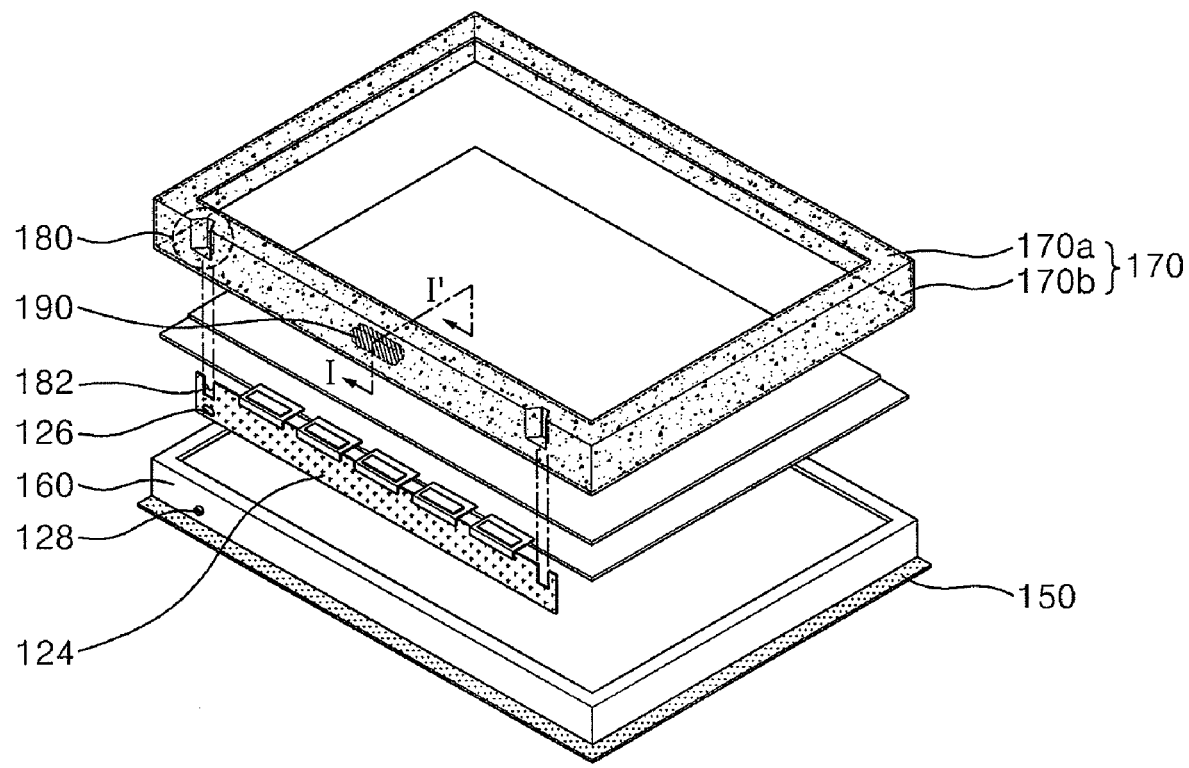
FIG. 10 is an exploded perspective view showing an LCD device according to an exemplary embodiment of the present invention.
Figure 11:
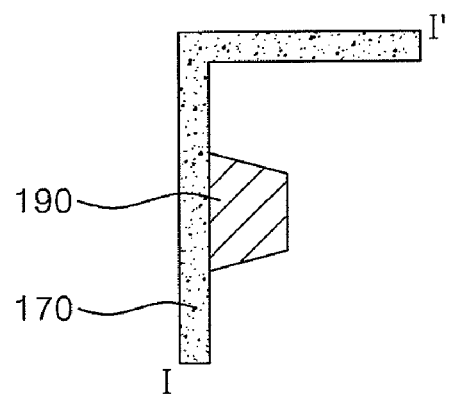
FIG. 11 is a cross-sectional view showing taken along line I-I' of FIG. 10.

FIG. 10 is an exploded perspective view showing an LCD device according to a seventh exemplary embodiment of the present invention and FIG. 11 is a cross-sectional view showing taken along line I-I' of FIG. 10. A pressure protrusion 190 is formed at a side frame portion 170b of the top chassis 170. The pressure protrusion 190 inwardly pressures the source PCB 124 to firmly fix the source PCB 124.

Accordingly to exemplary embodiments of the present invention, the fixing protrusion hole is formed at the side frame portion of the top chassis and is coupled to the fixing protrusion formed in the PCB to prevent the PCB from being separated from the top chassis. Also, the top chassis contacts with the bottom chassis through the fixing protrusion to improve the ground effect, thereby reducing the EMI.

In addition, a method of mounting the PCB in the LCD device applies to a light source driving substrate as well as the source PCB.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display ("LCD") device comprising:
   an LCD panel;
   a panel driver that includes a source printed circuit board ("PCB") substrate having a fixing protrusion hole to supply driving signals to the LCD panel; and
   a top chassis to receive the LCD panel and the panel driver, the top chassis including an upper frame portion to prevent the LCD panel from moving upwardly, a side frame portion to prevent the LCD panel from moving sideward, and a fixing protrusion protruded from an inner side of the side frame portion, wherein the fixing protrusion is coupled to the fixing protrusion hole to fix the source PCB inside the side frame portion of the top chassis and wherein the fixing protrusion hole fully penetrates through the source PCB and is adapted to receive the fixing protrusion therein.

2. The LCD device of claim 1, wherein the fixing protrusion has a taper shape, and
   a width of the fixing protrusion gradually narrows from the side frame portion of the top chassis to the inner side of the top chassis.

3. The LCD device of claim 1, wherein the fixing protrusion hole is formed at an inner part of the source PCB.

4. The LCD device of claim 1, wherein the fixing protrusion hole is formed at an edge part of the source PCB.

5. The LCD device of claim 1, further comprising:
   a backlight assembly;
   a bottom chassis on which the backlight assembly is mounted; and
   a middle mold to surround an outer surface of the bottom chassis to prevent backlight assembly separation and to support the LCD panel.

6. The LCD device of claim 5, wherein the top chassis comprises a pressure protrusion on the side frame portion to pressure the source PCB inwardly.

7. The LCD device of claim 5, wherein the middle mold comprises a spacing protrusion protruded from an outer surface to pressure the source PCB outwardly and the source PCB has a spacing protrusion hole coupled to the spacing protrusion to maintain a predetermined distance between the source PCB and the middle mold.

8. The LCD device of claim 5, wherein the middle mold has a penetration hole on the outer surface and the fixing protrusion makes contact with the bottom chassis through the penetration hole.

9. The LCD device of claim 1, wherein a portion of the fixing protrusion penetrates completely through the source PCB through the fixing protrusion hole when the fixing protrusion is coupled with the fixing protrusion hole.

10. A liquid crystal display (LCD) device comprising:
    an LCD panel;
    a panel driver that includes a source printed circuit board (PCB) substrate having a fixing protrusion hole;
    a top chassis to receive the LCD panel and the panel driver, the top chassis includes an upper frame portion to prevent the LCD panel from moving upwardly, a side frame portion to prevent the LCD panel from moving sideward, and a fixing protrusion protruded from an inner side of the side frame portion, wherein the fixing protrusion is coupled to the fixing protrusion hole to fix the PCB inside the side frame portion of the top chassis;
    a backlight assembly;
    a bottom chassis on which the backlight assembly is mounted; and
    a middle mold to surround an outer surface of the bottom chassis, to prevent backlight assembly separation and to support the LCD panel, and wherein the top chassis contacts with the bottom chassis through the fixing protrusion.

11. The LCD device of claim 10, wherein the fixing protrusion has a taper shape, and
    a width of the fixing protrusion gradually narrows from the side frame portion of the top chassis to the inner side of the top chassis.

12. The LCD device of claim 10, wherein the fixing protrusion hole is formed at an inner part of the PCB.

13. The LCD device of claim 10, wherein the fixing protrusion hole is formed at an edge part of the PCB.

14. The LCD device of claim 10, wherein the top chassis comprises a pressure protrusion on the side frame portion to pressure the PCB inwardly.

15. The LCD device of claim 10, wherein the middle mold comprises a spacing protrusion protruded from an outer surface to pressure the PCB outwardly and the PCB has a spacing protrusion hole being coupled to the spacing protrusion to maintain a predetermined distance between the PCB and the middle mold.

16. The LCD device of claim 10, wherein the middle mold has a penetration hole on the outer surface and the fixing protrusion contacts with the bottom chassis through the penetration hole.

17. The LCD device of claim 10, wherein the top chassis covers an outer surface of the middle mold and is coupled to the middle mold.

18. A method of mounting a printed circuit board (PCB) substrate in a liquid crystal display (LCD) device comprising:
- providing an LCD panel including a top chassis, the top chassis including an upper frame portion to prevent the LCD panel from moving upwardly and a side frame portion to prevent the LCD panel from moving sideward;
- forming a fixing protrusion hole fully penetrating through the PCB;
- forming a fixing protrusion at an inner side of the side frame portion of the top chassis; and
- coupling the fixing protrusion to the fixing protrusion hole such that the fixing protrusion is received therein and fixing the PCB inside the side frame portion of the top chassis.

19. A method of claim 18, wherein the fixing protrusion has a taper shape and a width of the fixing protrusion gradually narrows from the side frame portion of the top chassis to the inner side of the top chassis.

20. The method of claim 18, wherein the fixing protrusion hole is formed at an inner part of the PCB.

21. The method of claim 18, wherein the fixing protrusion hole is formed at an edge part of the PCB.

* * * * *